United States Patent [19]
Dobreski et al.

[11] Patent Number: 5,669,715
[45] Date of Patent: Sep. 23, 1997

[54] TAMPER-EVIDENT RECLOSABLE PLASTIC BAG WITH SLIDER

[75] Inventors: David V. Dobreski, Fairport; Michael W. McManus, East Rochester; Alexander R. Provan, Canandaigua; Toby R. Thomas, Pittsford, all of N.Y.

[73] Assignee: Tenneco Packaging, Evanston, Ill.

[21] Appl. No.: 700,680

[22] Filed: Aug. 16, 1996

[51] Int. Cl.⁶ ............................... B65D 33/18
[52] U.S. Cl. .................. 383/5; 24/400; 383/61; 383/64; 383/203; 383/204; 383/209; 383/210; 383/211
[58] Field of Search .................. 24/399, 400; 383/5, 383/61, 63, 64, 202, 203, 204, 205, 207, 209, 210, 211

[56] References Cited

U.S. PATENT DOCUMENTS

| | | | |
|---|---|---|---|
| Re. 33,674 | 8/1991 | Uramoto | 206/620 |
| Re. 34,554 | 3/1994 | Ausnit | 383/63 |
| 2,994,469 | 8/1961 | Troup et al. | 24/400 |
| 3,172,443 | 3/1965 | Ausnit | 383/5 |
| 3,339,606 | 9/1967 | Kugler | 383/211 |
| 3,780,781 | 12/1973 | Uramoto | 150/3 |
| 4,196,030 | 4/1980 | Ausnit | 156/91 |
| 4,923,309 | 5/1990 | VanErden | 383/5 |
| 4,947,525 | 8/1990 | Van Erden | 383/211 |
| 4,971,454 | 11/1990 | Branson | 383/5 |
| 5,007,142 | 4/1991 | Herrington | 24/400 |
| 5,007,143 | 4/1991 | Herrington | 24/400 |
| 5,010,627 | 4/1991 | Herrington et al. | 24/400 |
| 5,020,194 | 6/1991 | Herrington et al. | 24/400 |
| 5,023,122 | 6/1991 | Boeckmann et al. | 428/43 |
| 5,063,644 | 11/1991 | Herrington et al. | 24/400 |
| 5,067,208 | 11/1991 | Herrington, Jr. et al. | 24/400 |
| 5,070,583 | 12/1991 | Herrington | 24/400 |
| 5,088,971 | 2/1992 | Herrington | 493/203 |
| 5,092,684 | 3/1992 | Weeks | 383/61 |
| 5,092,831 | 3/1992 | James et al. | 493/394 |
| 5,116,301 | 5/1992 | Robinson et al. | 493/215 |
| 5,121,997 | 6/1992 | LaPierre et al. | 383/203 |
| 5,129,734 | 7/1992 | Van Erden | 383/61 |
| 5,131,121 | 7/1992 | Herrington, Jr. et al. | 24/436 |
| 5,161,286 | 11/1992 | Herrington, Jr. et al. | 24/387 |
| 5,186,543 | 2/1993 | Cochran | 383/203 |
| 5,189,764 | 3/1993 | Herrington et al. | 24/387 |
| 5,211,482 | 5/1993 | Tilman | 383/202 |
| 5,224,779 | 7/1993 | Thompson et al. | 383/5 |
| 5,283,932 | 2/1994 | Richardson et al. | 24/400 |
| 5,301,394 | 4/1994 | Richardson et al. | 24/399 |
| 5,301,395 | 4/1994 | Richardson et al. | 24/400 |
| 5,405,478 | 4/1995 | Richardson et al. | 156/308.4 |
| 5,426,830 | 6/1995 | Richardson et al. | 24/430 |
| 5,431,760 | 7/1995 | Donovan | 156/66 |
| 5,435,864 | 7/1995 | Machacek et al. | 156/66 |
| 5,442,837 | 8/1995 | Morgan | 24/400 |
| 5,442,838 | 8/1995 | Richardson et al. | 24/402 |
| 5,448,807 | 9/1995 | Herrington, Jr. | 24/399 |
| 5,456,928 | 10/1995 | Hustad et al. | 426/87 |
| 5,482,375 | 1/1996 | Richardson et al. | 383/64 |

*Primary Examiner*—Stephen P. Garbe
*Attorney, Agent, or Firm*—Arnold, White & Durkee

[57] ABSTRACT

A reclosable plastic bag comprises first and second opposing panels fixedly connected to each other along a pair of sides and a bottom bridging the pair of sides. The bag is provided with a reclosable zipper extending along a mouth formed opposite the sealed bottom. The zipper includes a male track with a male profile and a female track with a female profile. A slider is slidably mounted to the zipper for movement between a closed position and an open position. The male and female profiles are engaged to each other while the slider is in the closed position. The male and female profiles are disengaged from each other in response to movement of the slider to the open position. To prevent tampering with the contents of the plastic bag prior to being initially opened, the slider is initially parked in the closed position at one end of the zipper, and upper edges of the male and female profiles are detachably connected to each other, except at the one end of the zipper supporting the parked slider. The slider cannot be moved from the closed position until a one-time tamper-evident feature is broken or, alternatively, movement of the slider from the closed position will break the tamper-evident feature.

12 Claims, 3 Drawing Sheets

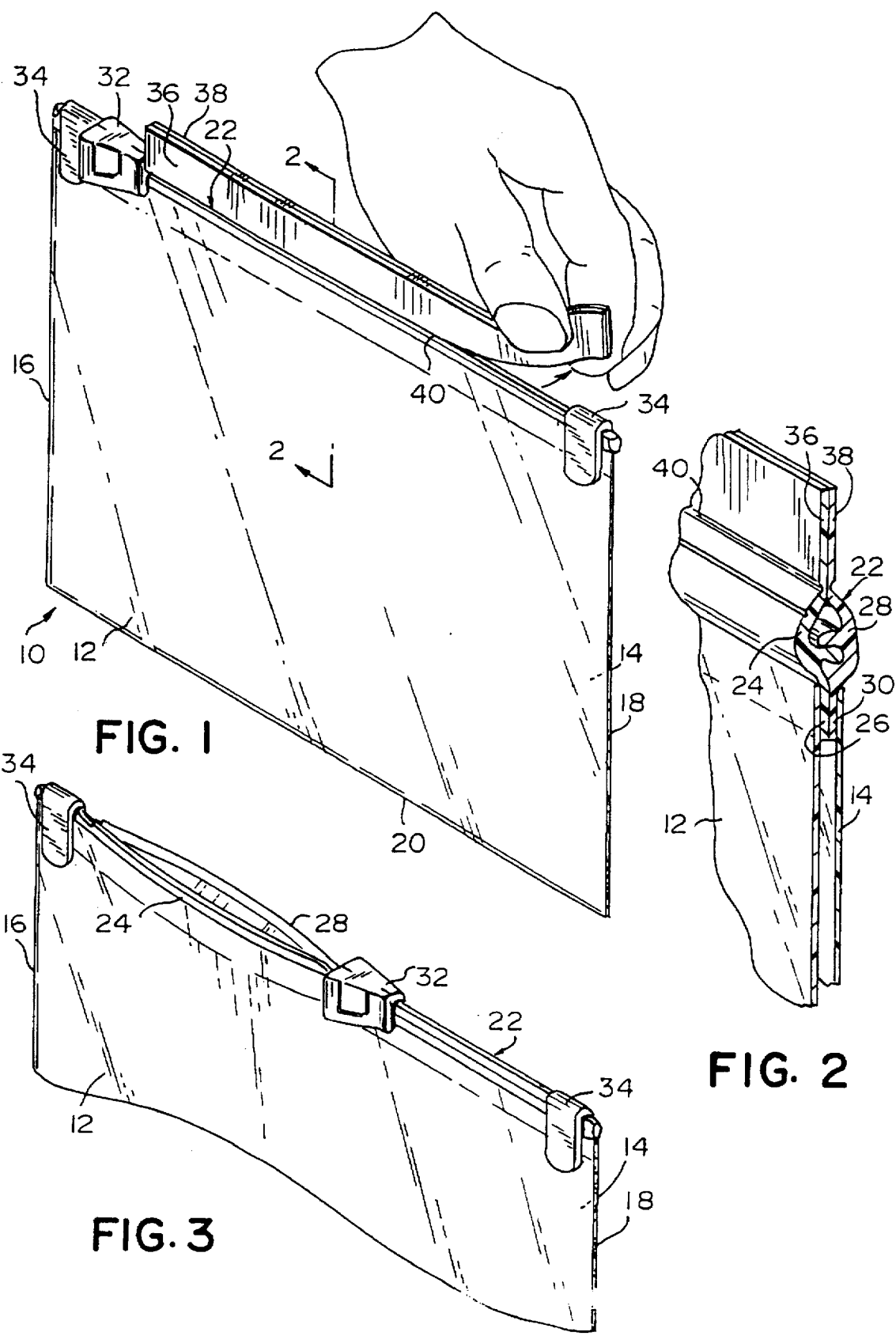

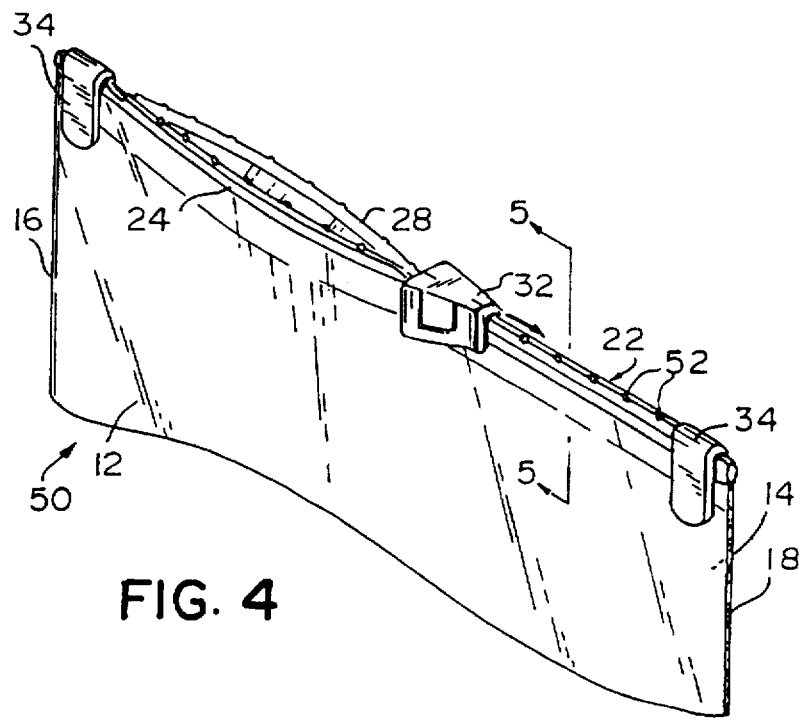
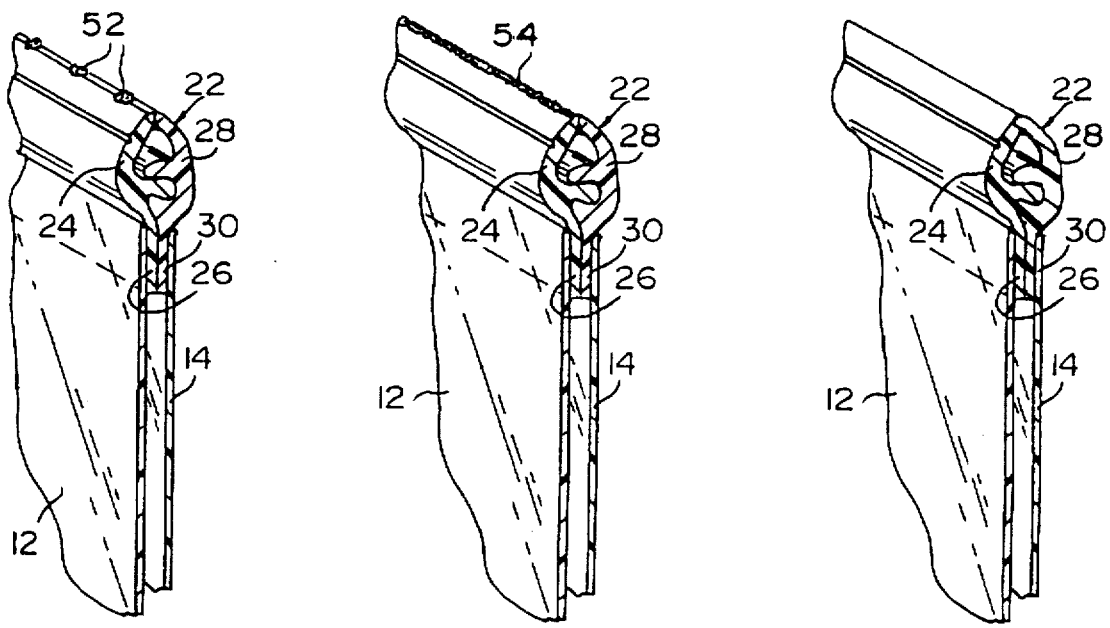
FIG. 4
FIG. 5    FIG. 6    FIG. 7

TAMPER-EVIDENT RECLOSABLE PLASTIC BAG WITH SLIDER

FIELD OF THE INVENTION

The present invention generally relates to reclosable plastic bags and, more particularly, to a reclosable plastic bag having a slider which cooperates with a tamper-evident feature.

BACKGROUND OF THE INVENTION

A reclosable plastic bag typically includes first and second opposing panels fixedly connected to each other along a pair of sides and a bottom bridging the pair of sides. The first and second panels are not fixedly connected along a mouth which is formed opposite to the sealed bottom. Rather, the bag is provided with a reclosable zipper extending along the mouth of the plastic bag. The zipper includes a male track and a female track. In reclosable plastic bags of the type disclosed in U.S. Pat. No. 5,067,208 utilizing a slider to open the zipper, the male track typically includes a male profile and a first fin extending downward from the male profile. Likewise, the female track in such bags with sliders includes a female profile and a second fin extending downward from the female profile. The first and second fins are thermally fused to the inner surfaces of the respective first and second panels.

The male and female tracks are typically free of any plastic material above the male and female profiles in order to permit proper mounting and movement of the slider. The male and female profiles are releasably engageable to each other. When the slider is in a closed position, the male and female profiles are interlocked with each other. In response to moving the slider to an open position, the male and female profiles are disengaged from each other. Once the male and female profiles are disengaged from each other, access to the interior of the bag may be obtained by pulling the first and second panels apart at the mouth.

Reclosable plastic bags of the foregoing type are a great convenience to the consumer especially for products such as deli meats and cheeses where, typically, only a portion of the product is used at any given time. A problem with these reclosable bags, however, is that gases within the bag can leak out of the bag and the external atmosphere can leak into the bag, promoting food spoilage. Another problem is that if such plastic bags are to be prepackaged with a food product and then sold in a grocery store, the contents of the plastic bags can easily be tampered with prior to purchase by the consumer.

A need therefore exists for a reclosable plastic bag with slider having a leak-proof and tamper-proof seal.

SUMMARY OF THE INVENTION

A reclosable plastic bag embodying the present invention comprises first and second opposing panels fixedly connected to each other along a pair of sides and a bottom bridging the pair of sides. The bag is provided with a reclosable zipper extending along a mouth formed opposite the sealed bottom of the plastic bag. The zipper includes a male track with a male profile and a female track with a female profile. The male and female profiles are releasably engageable to each other.

A slider is slidably mounted to the zipper for movement between a closed position and an open position. The male and female profiles are engaged to each other while the slider is in the closed position. The male and female profiles are disengaged from each other in response to movement of the slider to the open position.

To prevent tampering with the contents of the plastic bag prior to being initially opened, the slider is initially parked in the closed position at one end of the zipper, and upper edges of the male and female profiles are detachably connected to each other, except at the one end of the zipper supporting the parked slider. The slider cannot be moved from the closed position until a one-time breakable tamper-evident feature is broken or, alternatively, movement of the slider from the closed position will break the one-time breakable tamper-evident feature.

In one embodiment, the plastic bag is provided with first and second upstanding fins extending upward from the respective male and female profiles. The first and second upstanding fins are detachably connected to the male and female profiles along a preferential area of weakness (preferential tear area) and are attached to each other so as to effectively connect the upper edges of the male and female profiles. The first and second upstanding fins extend substantially across the bag mouth, with the exception that the fins do not occupy the portion of the zipper supporting the slider while the slider is in the closed position. The slider cannot be moved from the closed position until the first and second upstanding fins are detached from the male and female profiles along the preferential area of weakness. Once the first and second upstanding fins are removed, the slider can be moved to the open position to gain access to the interior of the plastic bag.

In another embodiment, the upper edges of the male and female profiles are directly connected to each other without the use of upstanding fins. Such direct connection may be accomplished by applying a continuous or intermittent bead of adhesive across the upper profile edges, by thermally sealing the upper profile edges, or by integrally forming (by extrusion) the upper edge of the male profile with the upper edge of the female profile. In this case, in response to moving the slider from the parked closed position to the open position, a separator finger on the slider breaks the direct connection of the upper edges of the male and female profiles.

BRIEF DESCRIPTION OF THE DRAWINGS

Other objects and advantages of the invention will become apparent upon reading the following detailed description and upon reference to the drawings in which:

FIG. 1 is a perspective view of a reclosable plastic bag embodying the present invention, showing the bag in sealed form with a tamper-evident feature in the process of being broken;

FIG. 2 is an enlarged section view taken generally along line 2—2 of FIG. 1;

FIG. 3 is a perspective view of the reclosable plastic bag, showing the bag in partially opened form after the tamper-evident feature has been completely broken;

FIG. 4 is a perspective view of another reclosable plastic bag embodying the present invention;

FIG. 5 is an enlarged section view taken generally along line 5—5 in FIG. 4;

FIG. 6 is an enlarged section view similar to that of FIG. 5 but employing a continuous bead of adhesive to connect the zipper profiles;

FIG. 7 is an enlarged section view similar to that of FIG. 5 but integrally forming the zipper profiles to connect them to each other;

Figure 8:
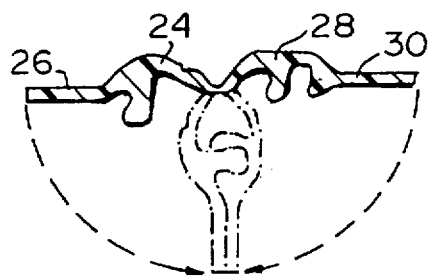
FIG. 8 is a section view of the zipper profiles as extruded with each other end-to-end to achieve the integral connection shown in FIG. 7.

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENTS

Turning now to the drawings, FIG. 1 depicts reclosable plastic bag 10 embodying the present invention. The plastic bag 10 comprises first and second opposing panels 12 and 14 fixedly connected to each other along a pair of sides 16 and 18 and a bottom 20 bridging the pair of sides 16 and 18. The bag 10 is provided with a reclosable zipper 22 extending along a mouth formed opposite the sealed bottom 20 of the plastic bag 10.

Referring to FIGS. 1 and 2, the zipper 22 includes a male track and a female track. The male track includes a male profile 24 and a first depending fin or flange 26 extending downward from the male profile 24. Likewise, the female track includes a female profile 28 and a second depending fin or flange 30 extending downward from the female profile 28. The first and second fins 26 and 30 are thermally fused to inner surfaces of the respective first and second panels 12 and 14. Alternatively, the zipper 22 may be coextruded with the panels 12 and 14 such that the first and second fins 26 and 30 are essentially nonexistent, i.e. the first fin 26 is integrally formed with the first panel 12 and the second fin 30 is integrally formed with the second panel 14.

To assist in opening the plastic bag 10, a slider 32 is slidably mounted to the zipper 22 for movement between a closed position and an open position. In the closed position of the slider 32 shown in FIG. 1, the male and female profiles 24 and 28 are interlocked with each other. Movement of the slider 32 from the closed position in FIG. 1 toward the open position (see FIG. 3) disengages the male and female profiles 24 and 28 from each other and allows a user to gain access to the interior of the plastic bag 10. Opposite ends of the zipper 22 are provided with end termination clamps 34. The end clamps 34 perform the dual function of stops for the ends of the zipper 22 to prevent the slider 32 from going past the end of the zipper 22 and, in addition, they hold the male and female profiles 24 and 28 together to resist stresses applied to the profiles during normal use of the plastic bag 10. Further details concerning the construction and operation of the slider 32 and the end clamps 34 may be obtained from U.S. Pat. No. 5,067,208 to Herrington, Jr. et al., which is incorporated herein in its entirety by reference.

To prevent tampering with the contents of the plastic bag 10 prior to being initially opened, the slider 32 is initially parked in the closed position at one end of the zipper 22 as depicted in FIG. 1. Moreover, upper edges of the male and female profiles 24 and 28 are detachably connected to each other, except at the one end of the zipper 22 supporting the parked slider 32, such that the slider 32 cannot be moved from the closed position until the tamper-evident feature is broken.

Specifically, as best shown in FIGS. 1 and 2, the plastic bag 10 is provided with first and second upstanding fins or flanges 36 and 38 extending upward from the respective male and female profiles 24 and 28. The first and second upstanding fins 36 and 38 are detachably connected to the male and female profiles 24 and 28 along a preferential area of weakness 40 and are thermally fused to each other so as to effectively connect the upper edges of the male and female profiles 24 and 28. The preferential area of weakness 40 may be in the form of a series of perforations, a scored line, a thinned line (extruded with less plastic material along the preferential area of weakness), or the like. The first and second upstanding fins 36 and 38 extend substantially across the bag mouth, with the exception that the fins 36 and 38 do not occupy the end portion of the zipper 22 supporting the slider 32 while the slider 32 is in the closed position.

The slider 32 is retained in the closed position by the ends of the first and second upstanding fins 36 and 38, thereby preventing access via the bag mouth to the interior of the plastic bag 10. The slider 32 cannot be moved from the closed position until the first and second upstanding fins 36 and 38 are detached from the male and female profiles 24 and 28 along the preferential area of weakness 40. To remove the first and second upstanding fins 36 and 38, a consumer first grasps the fins at one end of the bag mouth as shown in FIG. 1 and then pulls the fins in an upward direction away from the zipper 22. The pulling force causes the plastic bag 10 to tear along the preferential area of weakness 40. Once the first and second upstanding fins 36 and 38 are removed, the connection of the upper edges of the male and female profiles 24 and 28 is broken (because the male and female profiles 24 and 28 are not connected below the preferential area of weakness 40), thereby allowing the slider 32 to be moved to the open position to gain access to the interior of the plastic bag 10. FIG. 3 depicts the slider 32 in the process of being moved toward the open position.

Prior to being removed, the first and second upstanding fins 36 and 38 restrict access to the contents of the plastic bag 10. If a consumer purchases a prepackaged plastic bag 10 with the fins 36 and 38 intact, it is highly unlikely that the contents of the plastic bag 10 have been tampered with because the slider 32 cannot be moved and the bag mouth cannot be opened without first tearing off the fins 36 and 38. If, on the other hand, the consumer purchases a plastic bag 10 with part or all of the fins 36 and 38 detached from the zipper 22 along the preferential area of weakness 40, then it is more likely that the contents of the plastic bag 10 have been tampered with. Thus, the fins 36 and 38 provide an effective tamper-evident feature for the plastic bag 10.

Referring now to FIG. 4, a plastic bag 50 employs an alternative tamper-evident feature in accordance with the present invention. Elements of the plastic bag 50 in FIG. 4 corresponding to elements of the plastic bag 10 in FIG. 1 are designated by the same reference numerals. The plastic bag 50 is similar to the plastic bag 10 with the exception that the upper edges of the male and female profiles 24 and 28 are directly connected to each other along a line of connection without the use of the upstanding fins 36 and 38 of FIGS. 1–3.

Figure 9:
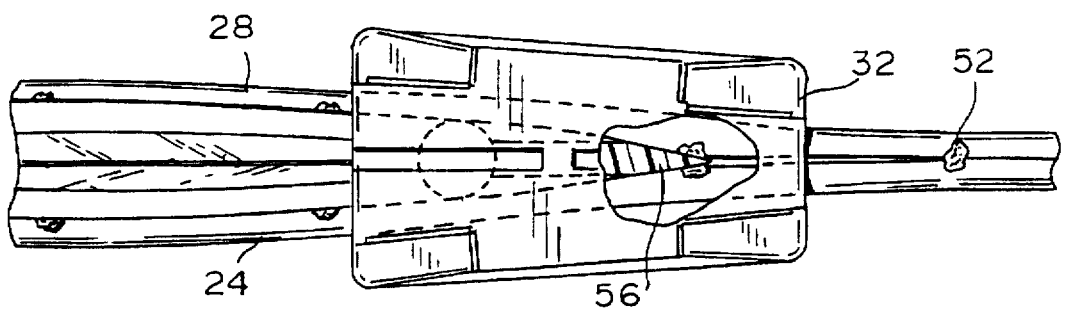
FIG. 9 is an enlarged top view of a zipper slider in the process of breaking a tamper-evident feature of the reclosable plastic bag in FIG. 4.

As shown in FIGS. 4–9, such a tamper-evident line of direct connection along the upper profile edges may be accomplished in several ways. In FIGS. 4, 5, and 9, an intermittent bead of adhesive 52 is applied across the upper edges of the male and female profiles 24 and 28. Alternatively, the upper profile edges may be intermittently sealed to each other by thermal fusion. In FIG. 6, a continuous bead of adhesive 54 is applied across the upper profile edges. Alternatively, the upper profile edges may be continuously sealed to each other by thermal fusion. In FIG. 7, the upper edge of the male profile 24 is integrally formed with the upper edge of the female profile 28. To achieve this integral connection, the male and female profiles 24 and 28 are extruded as one piece as shown in FIG. 8 and then folded into interlocking relationship.

Like the upstanding fins 36 and 38 in FIGS. 1–3, the tamper-evident line of direct connection of the upper profile edges extends substantially across the bag mouth, with the exception that the line of connection does not occupy the end portion of the zipper 22 supporting the slider 32 while the slider 32 is in the closed position. As shown in FIG. 4, movement of the slider 32 from the closed position will break the line of connection which, in FIG. 4, is formed by the intermittent bead of adhesive 52. As best shown in FIG. 9, the slider 32 includes a pointed separator finger 56 located between the male and female profiles 24 and 28. As the slider 32 is moved from the closed position to the open position, the leading point of the slider 32 simultaneously disengages the male and female profiles 24 and 28 from each other and breaks the line of connection along the upper profile edges.

Figure 10:
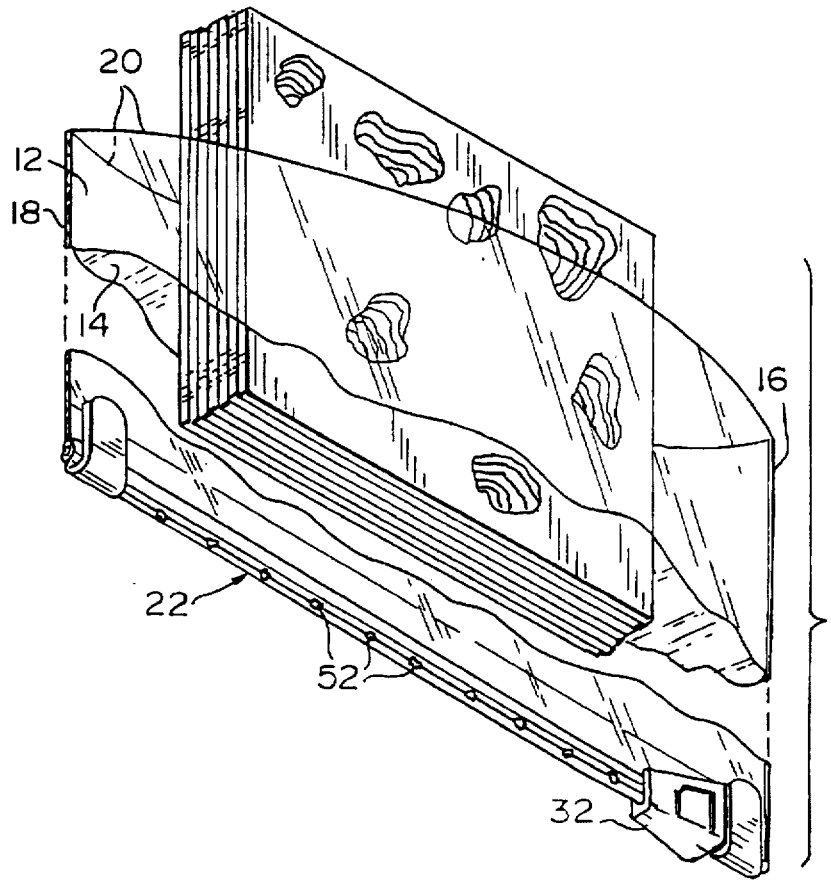
FIG. 10 is an inverted perspective view of the reclosable bag in FIG. 4 showing the bag being loaded with a food product through an unsealed bottom.

The line of connection along the upper profile edges serves as an effective tamper-evident feature because the line of connection restricts access to the contents of the plastic bag 50. If a consumer purchases a prepackaged plastic bag 50 with the line of connection intact, it is highly unlikely that the contents of the plastic bag 50 have been tampered with. As shown in FIG. 10, the plastic bag 50 may be prepackaged by inserting a food product through the unsealed bottom 20 and then permanently sealing the bottom 20 using thermal fusion. If, on the other hand, the consumer purchases a plastic bag 50 with part or all of the line of connection broken, then it is more likely that the contents of the plastic bag 50 have been tampered with.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A tamper-evident reclosable plastic bag, comprising:
   first and second opposing panels fixedly connected to each other along a pair of sides and a bottom bridging said pair of sides;
   a reclosable zipper extending along a mouth formed opposite said bottom, said zipper including a first track with a first profile and a second track with a second profile, said first and second profiles being releasable engageable to each other;
   a slider slidably mounted to said zipper for movement between a closed position and an open position, said first and second profiles being engaged to each other while said slider is in said closed position, said first and second profiles being disengaged from each other in response to movement of said slider from said closed position to said open position; and
   first and second upstanding fins extending upward from said respective first and second profiles, said first and second upstanding fins being detachably connected to said first and second profiles along a preferential area of weakness and being attached to each other, said first and second upstanding fins extend substantially across said mouth, an end portion of said zipper supporting said slider while said slider is in said closed position being free of said first and second upstanding fins such that said slider is substantially unmovable from said closed position until said first and second upstanding fins are detached from said first and second profiles along said preferential area of weakness.

2. The bag of claim 1, wherein said preferential area of weakness is selected from the group consisting of perforations, a score line, and a thinned line.

3. The bag of claim 1, wherein said first profile is a male locking profile and said second profile is a female locking profile.

4. A tamper-evident reclosable plastic bag, comprising:
   first and second opposing panels fixedly connected to each other along a pair of sides and a bottom bridging said pair of sides;
   a reclosable zipper extending along a mouth formed opposite said bottom, said zipper including a first track with a first profile and a second track with a second profile, said first and second profiles being releasable engageable to each other;
   a slider slidably mounted to said zipper for movement between a closed position and an open position, said first and second profiles being engaged to each other while said slider is in said closed position, said first and second profiles being disengaged from each other in response to movement of said slider from said closed position to said open position; and
   a line of connection joining upper edges of said first and second profiles and extending substantially across said mouth, an end portion of said zipper supporting said slider while said slider is in said closed position being free of said line of connection, said slider breaking said line of connection in response to movement of said slider from said closed position to said open position.

5. The bag of claim 4, wherein said line of connection includes an intermittent bead of adhesive applied across said upper edges of said first and second profiles.

6. The bag of claim 4, wherein said line of connection includes a continuous bead of adhesive applied across said upper edges of said first and second profiles.

7. The bag of claim 4, wherein said line of connection includes an integral formation of said upper edges of said first and second profiles.

8. The bag of claim 4, wherein said line of connection includes an intermittent thermal seal of said upper edges of said first and second profiles.

9. The bag of claim 4, wherein said line of connection includes a continuous thermal seal of said upper edges of said first and second profiles.

10. The bag of claim 4, wherein said slider includes a separator finger disposed between said first and second profiles, said separator finger breaking said line of connection in response to movement of said slider from said closed position to said open position.

11. In a tamper-evident reclosable plastic bag including first and second opposing panels fixedly connected to each other along a pair of sides and a bottom bridging said pair of sides; a reclosable zipper extending along a mouth formed opposite said bottom, said zipper including a first track with a first profile and a second track with a second profile, said first and second profiles being releasable engageable to each other; a slider slidably mounted to said zipper for movement between a closed position and an open position, said first and second profiles being engaged to each other while said slider is in said closed position, said first and second profiles being disengaged from each other in response to movement of said slider from said closed position to said open position; and first and second upstanding fins extending upward from said respective first and second profiles, said first and second upstanding fins being detachably connected to said first and second profiles along a preferential area of weakness and being attached to each other, said first and second upstanding fins extend substantially across said mouth, an end portion of said zipper supporting said slider while said slider is in said closed position being free of said first and second upstanding fins, a method of opening said plastic bag comprising the steps of:

detaching said first and second upstanding fins from said first and second profiles along said preferential area of weakness; and sliding said slider from said closed position to said open position.

12. In a tamper-evident reclosable plastic bag including first and second opposing panels fixedly connected to each other along a pair of sides and a bottom bridging said pair of sides; a reclosable zipper extending along a mouth formed opposite said bottom, said zipper including a first track with a first profile and a second track with a second profile, said first and second profiles being releasable engageable to each other; a slider slidably mounted to said zipper for movement between a closed position and an open position, said first and second profiles being engaged to each other while said slider is in said closed position, said first and second profiles being disengaged from each other in response to movement of said slider from said closed position to said open position; and a line of connection joining upper edges of said first and second profiles and extending substantially across said mouth, an end portion of said zipper supporting said slider while said slider is in said closed position being free of said line of connection, a method of opening said plastic bag comprising the steps of:

sliding said slider from said closed position to said open position to break said line of connection.

\* \* \* \* \*